United States Patent
Uddenberg et al.

(10) Patent No.: US 9,015,398 B2
(45) Date of Patent: *Apr. 21, 2015

(54) METHODS AND STRUCTURE FOR IDENTIFYING SUPPORT FOR SUPER-STANDARD FEATURES IN COMMUNICATIONS BETWEEN SERIAL ATTACHED SCSI DEVICES

(71) Applicants: David T. Uddenberg, Colorado Springs, CO (US); William W. Voorhees, Colorado Springs, CO (US)

(72) Inventors: David T. Uddenberg, Colorado Springs, CO (US); William W. Voorhees, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/070,870

(22) Filed: Nov. 4, 2013

(65) Prior Publication Data

US 2014/0059253 A1    Feb. 27, 2014

Related U.S. Application Data

(63) Continuation of application No. 13/455,749, filed on Apr. 25, 2012, now Pat. No. 8,595,408.

(51) Int. Cl.
*G06F 3/00* (2006.01)
*H04L 29/06* (2006.01)
*G06F 13/42* (2006.01)

(52) U.S. Cl.
CPC ...... *H04L 29/06163* (2013.01); *G06F 13/4291* (2013.01)

(58) Field of Classification Search
USPC ................................ 710/16–19, 104, 316
See application file for complete search history.

(56) References Cited

U.S. PATENT DOCUMENTS

| | | | |
|---|---|---|---|
| 7,228,364 B2 | 6/2007 | Ramsey et al. | |
| 7,363,395 B2 | 4/2008 | Seto | |
| 7,457,902 B2 * | 11/2008 | Yang et al. | 710/200 |
| 7,624,223 B2 * | 11/2009 | Clegg et al. | 710/316 |
| 8,051,216 B2 | 11/2011 | Sivertsen | |
| 8,595,408 B2 * | 11/2013 | Uddenberg et al. | 710/316 |

* cited by examiner

*Primary Examiner* — Tammara Peyton
(74) *Attorney, Agent, or Firm* — Duft Bornsen & Fettig LLP

(57) ABSTRACT

Methods and structure for determining compatibility between a pair of SAS devices for support of super-standard features of the devices. Features and aspects hereof provide for exchange of information between a first and second SAS device using SAS protocol in non-standard manners. The exchanges are designed to exchange information between compatible, enhanced device without causing protocol violation errors in either the first or second devices. The information exchanged represents super-standard features supported by each device. Mutually supported super-standard features are enabled for further communications between the devices. If no super-standard features are mutually supported or if the second device is non-enhanced, no super-standard features are enabled in further communications between the devices.

20 Claims, 5 Drawing Sheets

METHODS AND STRUCTURE FOR IDENTIFYING SUPPORT FOR SUPER-STANDARD FEATURES IN COMMUNICATIONS BETWEEN SERIAL ATTACHED SCSI DEVICES

CROSS REFERENCE TO RELATED APPLICATIONS

This patent application is a continuation patent application claiming priority to, and thus the benefit of an earlier filing date from, U.S. patent application Ser. No. 13/455,749 (filed Apr. 25, 2012), the entire contents of which are hereby incorporated by reference.

BACKGROUND

1. Field of the Invention

The invention relates generally to Serial Attached SCSI (SAS) communications and more specifically relates to methods and structure for communicating information between SAS devices to identify proprietary ("super-standard") features of SAS devices.

2. Discussion of Related Art

In communications between interconnected components of systems, it is common to utilize standardized communication protocols over standardized communication media. Relying on standardized communications allows mixing of components from a variety of vendors to exchange information in accordance with the utilized standard. However, in many cases, vendors prefer to provide enhancements available only when compatible components are interconnected—all from a common vendor. This allows vendors to enhance performance of a system when more of the vendor's products are utilized. In such cases, the components of the interconnected system must presume that all other components are compatible or may perform compatibility tests to determine whether other components of the system are compatible with the enhancements provided by a particular vendor.

One problem with testing components of a system to determine compatibility with vendor proprietary (super-standard) enhancements arises in that the testing procedure itself may generate protocol violations or other forms of errors in devices that are not compliant with the vendor's proposed enhancements. Such violations may cause error recovery procedures to be invoked within a device that fails the compatibility test. Such error recovery can confuse a user and can consume significant time and resources.

Thus, it is an ongoing challenge to provide methods and structures that can determine compatibility with vendor unique (super-standard) enhancements while reducing the potential for error conditions in non-compliant devices coupled within the system.

SUMMARY

The present invention solves the above and other problems, thereby advancing the state of the useful arts, by providing methods and structure for performing compatibility tests between SAS devices regarding super-standard features without causing protocol violations within non-compliant devices. A compatibility test transmits information from a first device to a second device using SAS protocols in non-standard ways that do not evoke a protocol violation within the first or second devices. The transmission represents one or more super-standard features available in the first device. If the second device is compliant with any of the one or more super-standard features represented by the non-standard transmission, it responds by returning similar information indicating its compatibility with one or more of the super-standard features available on the first device. When compatibility is established, the one or more super-standard features common to both SAS device are enabled for future communications between the devices. Otherwise, if the second device does not return any response to the transmission, or if there are no super-standard features common to both devices, all super-standard features are disabled for future communications between the devices. In some exemplary embodiments, the method is symmetric in that, upon establishing a first connection, each of the pair of connected devices sends information to the other device representing its supported super-standard features (rather than a second device "responding" to the information from the first device). In such embodiments, both devices determine which, if any, super-standard features are mutually supported and thus enabled for future communications between the pair of devices.

In one aspect hereof, a method operable in a first SAS device for determining compatibility of a second SAS device with one or more super-standard features. The method comprises performing a compatibility test between the first SAS device and the second SAS device and determining, within the first SAS device, whether the second SAS device is compliant with one or more super-standard features supported by the first SAS device based on results of the compatibility test. The method then enables use of the super-standard features in subsequent communications between the first SAS device and the second SAS device only in response to a determination that the second SAS device is compliant with the super-standard features. The compatibility test is performed without causing a protocol violation of a SAS specification in the first SAS device or in the second SAS device.

Another aspect hereof provides a computer readable medium embodying a method and provides the method operable in a first SAS device to determine compatibility of a second SAS device with one or more super-standard features of the first SAS device. The method comprises establishing a connection with the second SAS device and determining whether compatibility has already been tested with the second SAS device. Responsive to determining that compatibility has not yet been tested, the method then performs compatibility test between the first SAS device and the second SAS device and records that the compatibility test is completed with the second SAS device. The method also determines, responsive to the compatibility test, whether any of the one or more super-standard features are supported by both the first and second SAS devices. Responsive to determining that one or more super-standard features are supported by both the first and second SAS devices, the method then enables one or more of the super-standard features supported by both the first and second SAS device for subsequent communications between the first and second SAS devices.

DETAILED DESCRIPTION OF THE DRAWINGS

Figure 1:
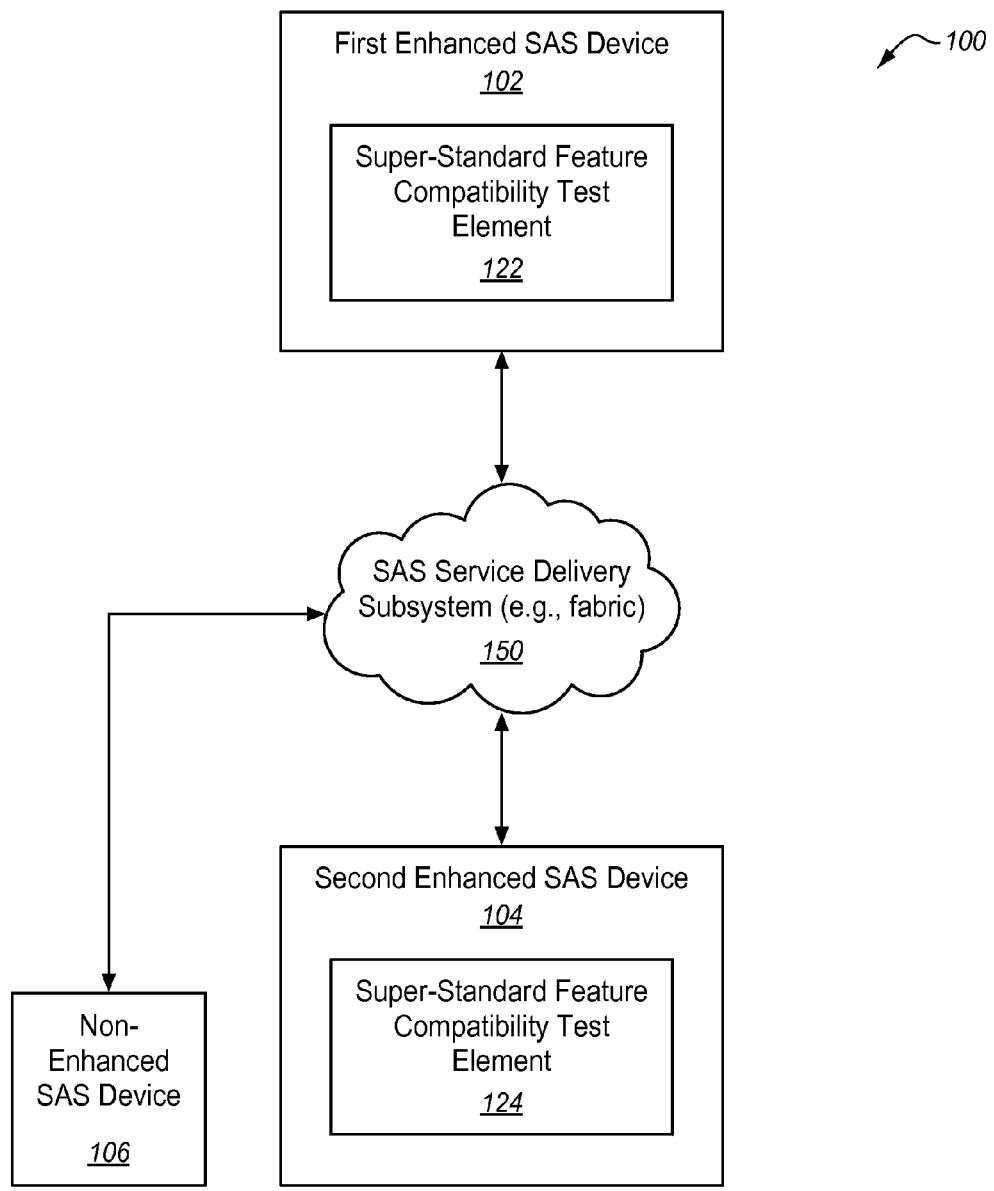
FIG. 1 is a block diagram of a system comprising one or more SAS devices enhanced in accordance with features and aspects hereof to determine compatibility of one or more other SAS devices with one or more super-standard features supported by an enhanced SAS device.

FIG. 1 is a block diagram of a system 100 comprising two or more enhanced SAS devices 102 and 104 coupled through a SAS Service Delivery Subsystem 150 (e.g., a SAS fabric comprising one or more SAS expanders or direct connections as appropriate to the particular application needs). In accordance with features and aspects hereof, SAS devices 102 and 104 exchange information to determine a level of mutual compatibility for super-standard features supported by each of the devices. As used herein, "super-standard" refers to features outside of SAS specifications that permit enhanced operation between devices compliant with such super-standard features. Examples of super-standard features include: frame sizes greater than 1 KB, power saving modes, link rates beyond SAS specification, lower signal amplitudes to save power, etc.

Enhanced SAS devices 102 and 104 each comprise a super-standard feature compatibility test element 122 and 124, respectively. Compatibility test elements 122 and 124 may each be implemented as suitably programmed instructions executed by an appropriate general or special purpose processor (not shown) within the corresponding enhanced SAS device 102 and 104, respectively. In other exemplary embodiments, compatibility test elements 122 and 124 may each be implemented as suitably designed custom circuits within enhanced SAS devices 102 and 104, respectively. In still other exemplary embodiments, test elements 122 and 124 may be implemented as combinations of suitably programmed instructions and suitably custom designed circuits. In general, super-standard feature compatibility test elements 122 and 124 may be integrated with other standard elements of devices 102 and 104, respectively, including, for example, physical layer (PHY) management/control components/circuits, link layer management components/circuits, or other appropriate layers of the SAS protocol management features of devices 102 and 104. As will be evident to those of ordinary skill in the art, each exemplary embodiment of a compatibility test as detailed herein below may be implemented within an appropriate layer of the SAS protocol stack of processing elements.

In operation, compatibility test elements 122 and 124 exchange information utilizing features of the SAS protocols that are outside of standard specifications of the SAS protocol. The exchanges utilize SAS features that should not cause a protocol violation error within enhanced SAS devices 102 and 104 or within a non-compliant, non-enhanced SAS device (e.g., SAS device 106). In performing the compatibility test exchanges, when first establishing a connection to a device, each device will exchange compatibility information indicating one or more super-standard features supported by that device. In response to receipt of such a transmission, the receiving device will respond by communicating information identifying one or more super-standard features that it supports. Each device may then determine a subset of commonly supported super-standard features that may be utilized in further exchanges between the pair of devices. As noted, the exchanges are particularly selected so as to not generate a protocol violation in a non-compliant, non-enhanced device. For example, when first enhanced SAS device 102 attempts to establish compliance with super-standard features by communicating with non-enhanced SAS device 106, the non-enhanced device will not respond with a return communication indicating its supported super-standard features and further will not be subject to a protocol violation that may generate error recovery procedures within non-enhanced SAS device 106. Thus, all enhanced devices in system 100 (e.g., 102 and 104) may establish mutually supported super-standard features utilizing SAS communications while avoiding potential protocol violations in non-compliant SAS devices.

Exemplary Compatibility Tests

The following sections suggest some exemplary SAS exchanges that may be used to exchange compatibility information for super-standard features between SAS devices. These exemplary exchanges allow compatible devices to communicate super-standard features while non-compliant (non-enhanced) SAS devices should ignore (e.g., discard) the non-standard SAS exchanges and will therefore not encounter a SAS protocol violation. As noted above, the compatibility test may be run at a first connection between two devices— e.g., at start of day after initialization or after a link reset. Preferably, the compatibility tests are symmetric in that every enhanced device of a SAS domain performs the compatibility test(s) with each other enhanced device of the domain as an aspect of its first attempt to connect with each such other enhanced device. In other embodiments, a first enhanced device may perform a compatibility test with another (a second) enhanced device and that pair of enhanced devices may share the test results. In other words, only one enhanced device of each pair of enhanced devices needs to run the compatibility test for that pair of devices. In all embodiments, a compatibility test with a non-enhanced device is simply ignored by the non-enhanced device so that no protocol violation is detected and associated error recovery is avoided. The results of the test (i.e., compatibility with one or more super-standard features or incompatibility with all such super-standard features) may be stored in a memory of the first device such that subsequent connections between the devices need not re-run the test. The test results may be inspected in the memory for subsequent connections to determine which, if any, super-standard features may be utilized.

Rotation of ALIGN Primitives

SAS specifications requires that a device rotate the ALIGN primitives periodically transmitted as ALIGN(0), ALIGN(1), ALIGN(2), ALIGN(3), ALIGN(0), ALIGN(1) ALIGN(2), ALIGN(3), etc. For example, the SAS specifications call for ALIGN primitives to be transmitted to help avoid clock skew in a connection and require rotation of the use of ALIGN primitives to reduce radiated emissions. The SAS specifications call for the periodic ALIGN primitives to be rotated but does not require the receiving device to verify the rotated pattern. According to this exemplary compatibility test, the rotation pattern can be changed to the reverse order to represent availability of one or more super-standard features in the first device. In the SAS specifications, the receiver does not check for proper ALIGN rotation. Thus, if the attached device is not a compatible, enhanced SAS device with super-standard features supported, no SAS protocol violation will be detected. In such a case, the first device (the device sending the reversed rotation pattern) will time out waiting for the response from the second device having the same reversed rotation ALIGN pattern. In case of such a time out, the first device understands that the second device is not enhanced and no super-standard features may be used in future communications with the second device. If the second device is a SAS device with super-standard features supported, it will return the ALIGN primitives in the same reverse rotation to indicate its support for the represented super-standard features. In other exemplary embodiments, both devices send information representing supported super-standard features to the other device upon establishing a first connection (rather than a second device "responding" to a transmission from a first device). Enhanced devices will check for the ALIGN rotation pattern and use enhanced communication features (super-standard features) when the reverse rotation pattern is detected. This method works for direct attach connections and may not work for devices coupled through SAS expanders since ALIGN rotation is not required to be passed through an expander to another device. The reverse rotation pattern is just one example of the ordering of ALIGN primitives. Other ALIGN rotation patterns other than the pattern of rotation documented in the SAS specification could be used as well. Each different rotation could be used to represent one or more corresponding super-standard features.

ALIGN Bursts

A burst of consecutive ALIGN primitives can be used as the compatibility detection method. If the burst pattern is sent and returned then compatibility is confirmed. The burst "pattern" may comprise a number of consecutive ALIGN primitives. The compatibility information conveyed by the burst pattern could be determined: as a function of the length of the burst pattern, as a function of when the burst is received relative to other transmissions, as a function of a specific sequences of the ALIGN primitives within a burst (e.g., a pattern combining consecutive ALIGN primitives in a pattern intended to encode information regarding supported super-standard features), etc., as well as various combinations of such encoding patterns. Various patterns can be defined that indicate the list of super-standard features supported by the transmitting device. The pattern may be sent multiple times so that if a bit error occurs in the pattern causing the compatibility test to fail, there are other chances to pass the test. This method works for direct attached devices and works for indirectly attached devices through an expander. For the direct attach case, the burst pattern can be sent at any time, inside or outside of a connection. For the expander attach case, the burst pattern may be sent within a frame—i.e., in the context of an established connection between the two devices. If the connected device is not compatible, the pattern is not a SAS spec violation so no error recovery is required in the second device. In such a case, the first device will time out waiting for return of the burst pattern and thus will determine that the second device is not compatible with any super-standard features.

Data and ALIGN Burst Patterns

A pattern of data dwords mixed with ALIGN primitive dwords can be used as the compatibility detection method inside of a SAS DATA frame. This test is likely the best known mode for implementing a compatibility test. This test method is similar to the SNW3 window in the SAS specification in which capability bits are exchanged between two attached devices during the speed negotiation procedure. In this test method each pattern of data and ALIGN primitive dwords could be associated with a corresponding one or more super-standard features. For this compatibility test method, a super-standard feature cell time could be defined within the DATA frame, for example 16 dwords (symbol times). If the 16 dwords are all data dwords, then the associated super-standard feature is not supported. If the 16 dwords are all ALIGN primitives (e.g., any combination of ALIGN primitives), then the associated super-standard feature is supported. The length of the cell time could be any length of dwords—16 is just an example. Additionally, the encoding of the cell may utilize any one of a variety of binary coding schemes, including for example, differential, bi-phase, Manchester, return-to-zero formats, etc. Some bits could be identification bits identifying the transmitting device (e.g., a product name and/or SAS device type (initiator, target, expander)), and other bits could indicate that a super-standard feature corresponding to the bit is or is not supported. This method works for both direct attach and expander attach cases. If the connected device is not compatible, the bursts of ALIGN primitives within a DATA frame are not a SAS spec violation so no error recovery is required.

Custom Primitive

A custom (non-deletable) primitive is sent inside of a connection as the compatibility detection method. SAS specifications recite some primitives that are deletable (and hence ignored on occasion according to the SAS standard). This custom, non-deletable primitive is a primitive that is not defined by the SAS standards as part of the standard protocol but is also not specified as deletable by the standard.

In particular, the custom primitive would be a non-deletable SAS primitive where the deletable SAS primitives specified by SAS standards include (by way of example):
ALIGN(0)
ALIGN(1)
ALIGN(2)
ALIGN(3)
MUX (LOGICAL LINK 0)
MUX (LOGICAL LINK 1)
NOTIFY (ENABLE SPINUP)
NOTIFY (POWER LOSS EXPECTED)
NOTIFY (RESERVED 1)
OOB_IDLE By contrast, exemplary non-deletable SAS primitives include:
BREAK
CLOSE
DONE
SOF
EOF
ACK
NAK In general, a custom, non-deletable primitive could be any K28.5-based primitives (e.g., as specified in appendix K of the SPL-2 standards documents) that are unused (e.g., K28.5 D16.7 D29.7 D24.0 or K28.5 D24.0 D01.4 D16.7). In some embodiments, it is preferred that the selected custom primitive be programmable in the enhanced SAS device to allow compatibility with future versions of the SAS standards that may define a use for a previously unused primitive. An alternative approach would be to have the custom non-deletable primitive declared as "vendor specific" in the standard, thereby preventing it from being standardized.

The custom primitive is associated with a corresponding one or more super-standard features supported by the device. If the custom primitive is sent and returned in a connection then compatibility is confirmed. If the custom primitive is sent but not returned (before a time out period), then the associated one or more super-standard features are not supported. The custom primitive may be sent in three or more separate connections so that if a bit error occurs in the primitive causing the compatibility test to fail, it still has two or more other chances to pass. This method works for direct attach and expander attach cases. If the attached device is not compatible, the custom primitive is not a SAS spec violation and is ignored so that no error recovery is required.

Non-Standard SAS Frames

At start of day during domain discovery (or after a link reset), an initial DATA frame may be sent by a first enhanced SAS device in a first connection with another SAS device. The initial DATA frame contains information regarding one or more super-standard features that are supported by the first device. The initial DATA frame must be sent before any commands requiring a DATA frame transmission are outstanding between the two devices—e.g., before a frame is transmitted for a read or write command. If the DATA frame, which may be of a unique length and occurs with no read/write commands outstanding, is both sent and returned then compatibility is confirmed with respect to the super-standard features common to the sent and received DATA frames. If the DATA frame is sent to an incompatible (non-enhanced) device, the second device will discard the frame without a protocol violation and no error handling is required.

Other variations of this approach are possible. For example, in some exemplary embodiments, a SAS Address Frame may be transmitted with a type code specified by the SAS standards as "unknown". Such an unknown type code may be used to represent super-standard features supported by the transmitting device. The SAS standards indicate that such unknown types of Address Frames are to be ignored and thus may be used for implementing features and aspects hereof.

In still other exemplary embodiments, the DATA OFFSET field in a Serial SCSI Protocol (SSP) header. According to the SAS standards, this field should be set to zero when the frame is a non-data frame. The SAS standard further specifies that this field should be ignored in such a non-data frame. Thus, this field could be used to represent supported super-standard features of a transmitting device (when encoded with a non-zero value such as in a SCSI COMMAND frame) without causing a protocol in a non-enhanced receiving device.

Those of ordinary skill in the art will readily recognize numerous other compatibility tests that may be employed that comprise exchange of information between two devices using non-standard SAS protocol that do not give rise to protocol violations and associated error recovery. Further, those of ordinary skill will recognize that any number of SAS devices may be present in such a SAS domain including any number of super-standard feature compliant (enhanced) devices as well as any number of non-enhanced, non-compliant devices. Further, each SAS device may be a SAS initiator, a SAS target, or a SAS expander. Further, those of ordinary skill in the art will readily recognize numerous additional and equivalent elements that may be present in fully functional SAS domains.

Figure 2:
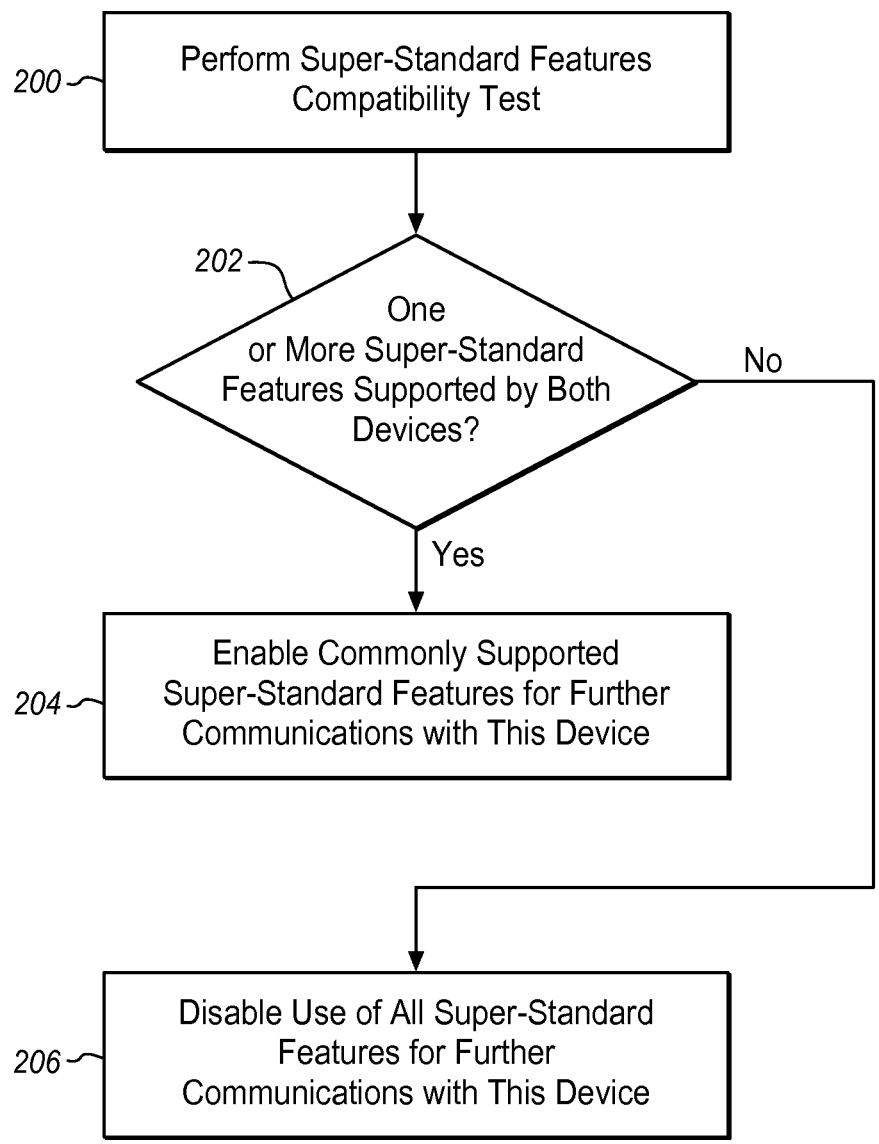
FIGS. 2 through 4 are flowcharts describing exemplary methods in accordance with features and aspects hereof to determine compatibility of one or more other SAS devices with one or more super-standard features supported by an enhanced SAS device.

FIG. 2 is a flowchart describing an exemplary method for determining mutually supported super-standard features between a pair of SAS devices in accordance with features and aspects hereof. The method of FIG. 2 may be operable in a system comprising any number of enhanced SAS devices such as system 100 of FIG. 1. More specifically, the method of FIG. 2 may be operable in a first enhanced SAS device 102 of FIG. 1 testing compatibility for super-standard features with a second enhanced device 104 of FIG. 1. At step 200 a first SAS device (enhanced to support one or more super-standard features) performs a compatibility test by exchanging information with another SAS device. Step 202 then determines whether the compatibility test reveals that one or more super-standard features are supported by the second SAS device. If not, step 206 disables use of all super-standard features for further communications with the particular second SAS device. If step 202 determines that one or more super-standard features are supported by the second device, step 204 enables use of one or more commonly supported super-standard features for further communications between the first device and the second device.

In general, the method of FIG. 2 may be performed upon establishing a first connection between the first device and the second device following start of day initialization or following a reconfiguration of the SAS domain (e.g., following a link reset between the first and second SAS devices). Once the method of FIG. 2 has established the level of compatibility for mutually supported super-standard features (if any), the test need not be run again until a reset of the link between the two devices or any other configuration change to or reset of the SAS domain. In other words, the level of compatibility for mutually supported super-standard features may be recorded in a suitable table in a memory within the first SAS device so that on subsequent connections between the two devices the table may be queried to determine that the compatibility test has already been performed.

Figure 3:
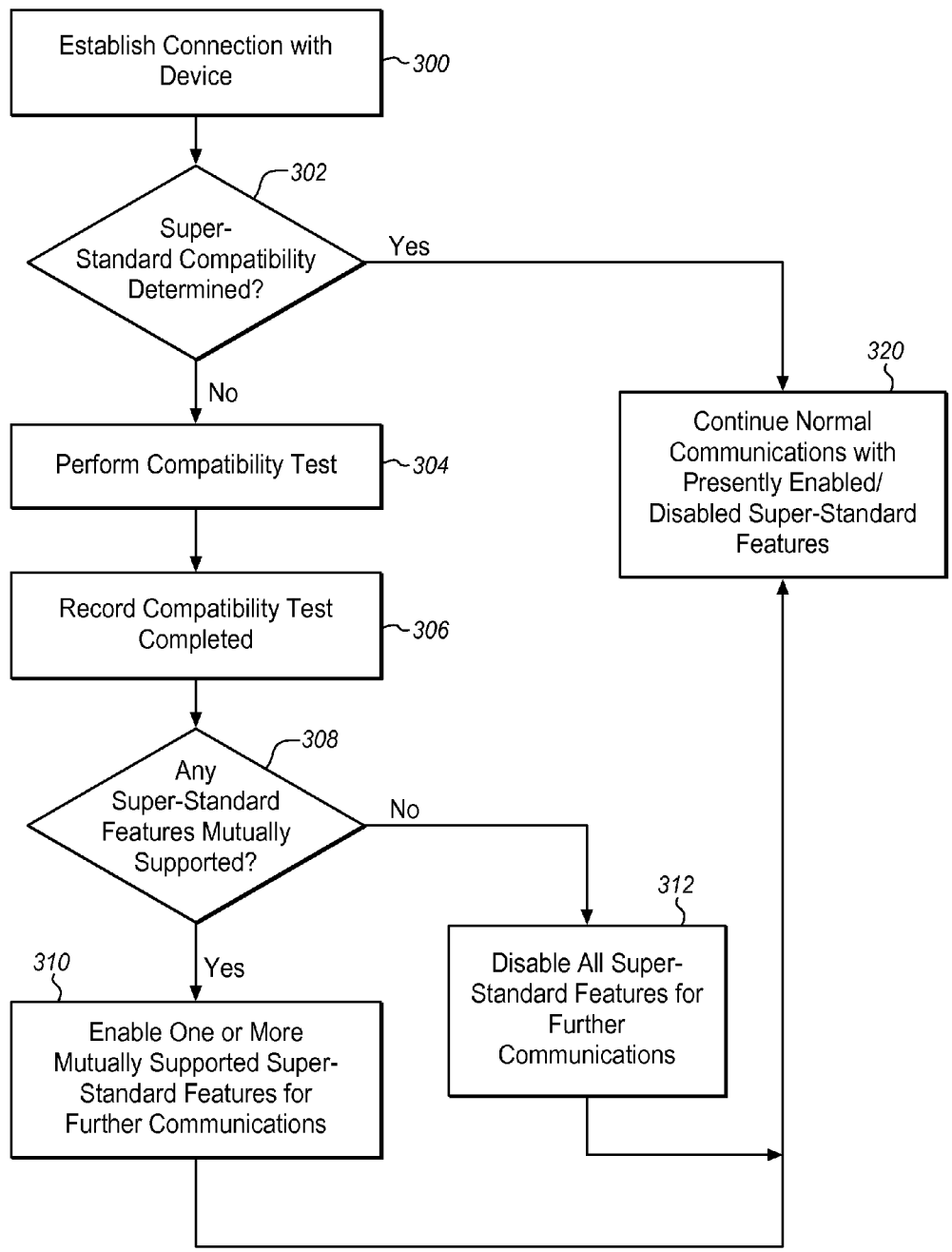

FIG. 3 is a flowchart describing another exemplary method for determining a level of mutually supported super-standard features between two devices in a SAS domain. The method of FIG. 3 may be performed in a system comprising any number of enhanced SAS devices such as system 100 of FIG. 1 and more specifically may be performed within devices 102 and 104 of FIG. 1. At step 300, a connection is established between a first SAS device and a second SAS device. Step 302 then determines whether the super-standard feature compatibility test has already been performed such that the level of mutually supported super-standard features has already been determined. If so, step 320 continues normal communications between the first and second SAS devices utilizing the presently enabled or disabled super-standard features as previously determined by the earlier compatibility test. Thus, for all subsequent connections established between two SAS devices following the first established connection, the results of the previously performed compatibility test are relied upon for determining which, if any, super-standard features are mutually supported.

If the compatibility test has not yet been performed, step 304 performs an appropriate compatibility test to determine a level of compatibility between the two devices as regards one or more super-standard features. Following completion of the test, step 306 records the results of the compatibility test in an appropriate table structure in a memory of the first SAS device. The stored results indicate a level of compatibility (or incompatibility) for super-standard features within the second SAS device. In some exemplary embodiments, every device may perform the same compatibility test for every other SAS device with which it connects at the time of its first such connection to each other device—including devices that have contacted it and run a compatibility test. Thus, in such embodiments, the method is identical and symmetric among all enhanced SAS devices of the SAS domain—even if some compatibility tests are duplicated by being initiated in both directions between a pair of SAS devices. In other exemplary embodiments, a second device that receives a compatibility test transmission and responds accordingly may simply record the mutually supported features for the SAS device that contacted it to perform a compatibility test and thus avoid duplicating the same compatibility test when it first establishes a connection back to another device for which a compatibility test has already been performed. Having thus recorded the completion status of the compatibility test, subsequently opened connections will utilize results from the completion of the test as discussed above with respect to step 302. Step 308 then determines whether the completed compatibility test indicates that any super-standard features are mutually supported by both the first and second SAS devices. If not (if there are no common super-standard features or if the second device never responded to the test), step 312 disables use of any of the super-standard features available in the first SAS device for any future communications between the first SAS device and the second SAS device until such time that it is appropriate to re-test the super-standard capabilities of the devices (e.g., after a new link reset or a next power cycle). Processing then continues at step 320 to continue normal communications between the first and second device with none of the super-standard features enabled. If step 308 determines that any one or more of the super-standard features are mutually supported by both the first and second SAS device, step 310 enables one or more super-standard features that are common to both the first and second SAS devices. Processing then continues at step 320 to continue normal communications between the first and second devices utilizing the one or more enabled super-standard features.

Figure 4:
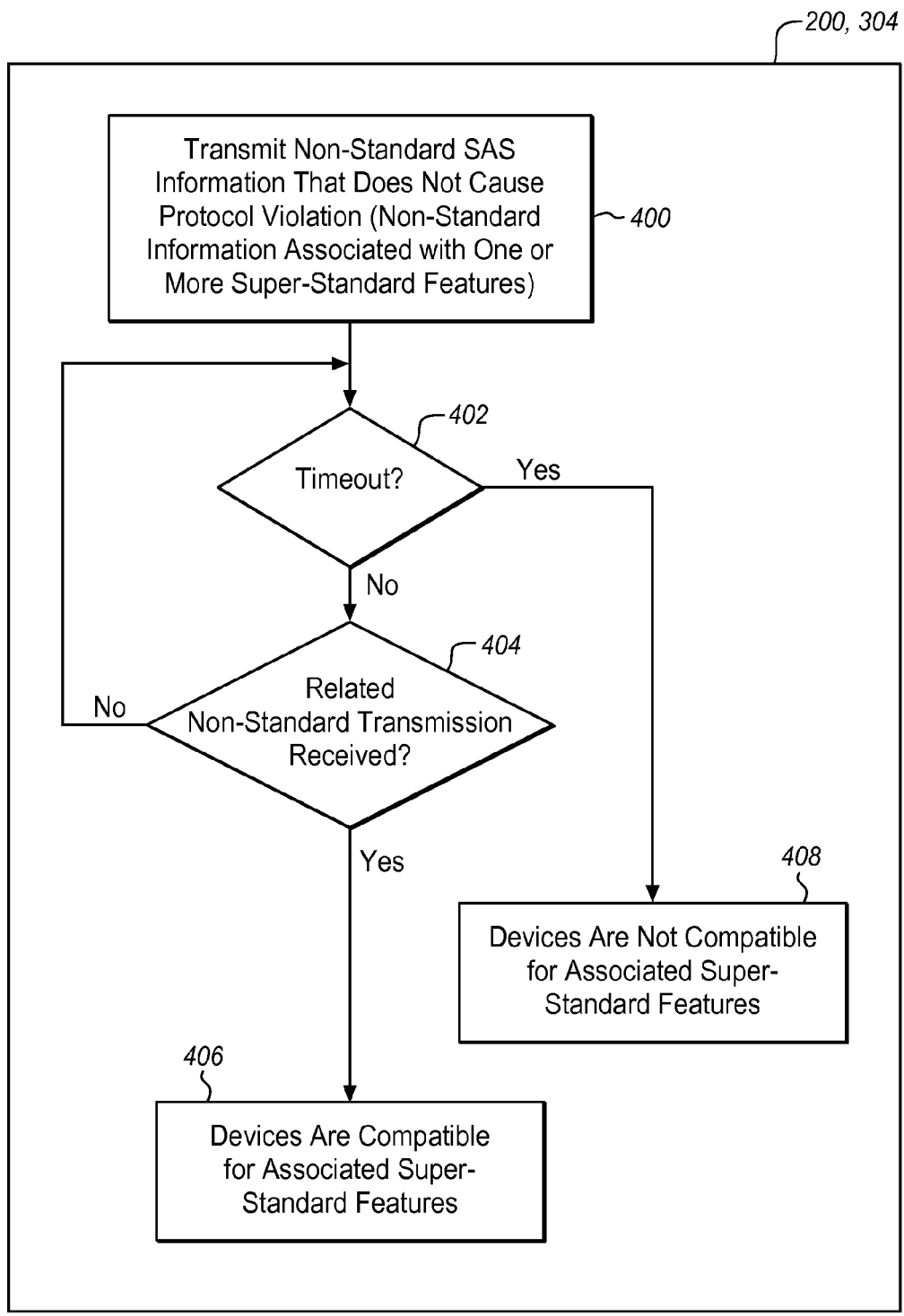

FIG. 4 is a flowchart describing exemplary additional details of the processing of step 200 of FIG. 2 and step 304 of FIG. 3 to perform a compatibility test between a first and second SAS device. At step 400, information is transmitted from the first device to the second device utilizing the SAS protocol in a non-standard manner. The specific information transmitted represents one or more super-standard features available on the first SAS device. Steps 402 and 404 are then iteratively operable to await receipt of returned information from the second device or the expiration of a timeout period without such a response. If step 402 determines that the timeout has expired, step 408 completes the compatibility test indicating that the devices are not compatible with respect to any of the one or more associated super-standard features represented by the non-standard information transmitted at step 400. If the timeout has not yet expired, step 404 determines whether a related return transmission has been received from the second SAS device indicating its supported super-standard features. If no such return transmission has been received, processing continues looping to step 402 to await receipt of such a return transmission or the expiration of a timeout. If step 404 detects receipt of a return transmission from the second SAS device, step 406 completes the compatibility test indicating that the first and second SAS devices are compatible with respect to mutually supported super-standard features represented by the non-standard SAS transmission and non-standard return transmission received from the second device. In general, step 406 determines which super-standard features are common to both the first and second SAS devices based on the non-standard transmissions (i.e., which are mutually supported). The commonly supported features may be enabled as described above with respect to FIGS. 2 and 3. In some exemplary embodiments, some super-standard features may be supported by the first device but not by the second and vice versa. Thus, only the mutually supported super-standard features will be enabled for further communications between the first and second SAS devices.

Those of ordinary skill in the art will readily recognize numerous additional and equivalent steps that may be present in fully functional methods such as the methods of FIGS. 2 through 4. Such additional and equivalent steps are omitted herein for simplicity and brevity of this discussion.

Figure 5:
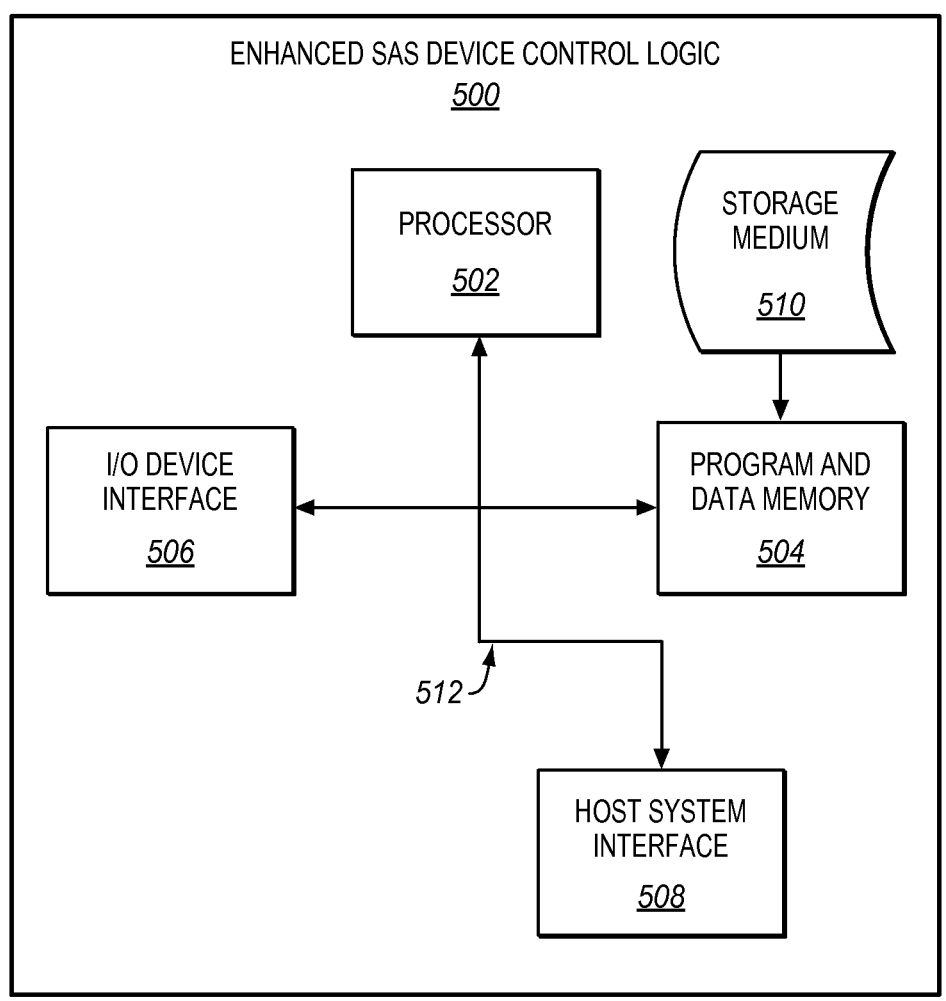
FIG. 5 is a block diagram of control logic of an enhanced SAS device such as in FIG. 1 comprising a computer readable medium.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc. FIG. 5 is a block diagram depicting control logic of an enhanced SAS device (such as devices 102 and 104 of FIG. 1) adapted to provide features and aspects hereof by executing programmed instructions and accessing data stored on a computer readable storage medium 510. Logic 500 may be a computer such as embedded within the SAS device that performs compatibility tests to determine a level of mutual support for one or more super-standard features of a pair of SAS devices.

Furthermore, embodiments of the invention can take the form of a computer program product accessible from a computer-usable or computer-readable medium 510 providing program code for use by, or in connection with, a computer or any instruction execution system. For the purposes of this description, a computer-usable or computer readable medium can be any non-transitory apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Logic 500 suitable for storing and/or executing program code will include at least one processor 502 coupled directly or indirectly to memory elements 504 through a system bus 512. The memory elements 504 can include local memory employed during actual execution of the program code, bulk storage, and cache memories that provide temporary storage of at least some program code in order to reduce the number of times code must be retrieved from bulk storage during execution.

Input/output interface 506 couples the logic to I/O devices (e.g., other SAS devices, etc.). Host system interface 508 may also couple logic 500 to other data processing systems.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage system, comprising:
   first and second devices operable to connect to each other in the storage system via a storage protocol,
   wherein the first device comprises a set of capabilities in addition to a set of capabilities of the storage protocol,
   wherein the first device is operable to transfer a customized command to the second device through a connection established via the storage protocol, and
   wherein the customized command is operable to elicit a response from the second device if the second device has a set of capabilities in addition to the set of capabilities of the storage protocol that is similar to the additional set of capabilities of the first device, and to prevent a violation of the storage protocol if the second device does not have the similar additional set of capabilities.

2. The storage system of claim 1, wherein the storage protocol is a Serial Advanced Technology Attachment protocol.

3. The storage system of claim 1, wherein:
the storage protocol is a Small Computer System Interface protocol.

4. The storage system of claim 3, wherein:
the storage protocol is a Serial Attached Small Computer System Interface protocol.

5. The storage system of claim 4, wherein:
the customized command includes a sequence of Serial Attached Small Computer System Interface ALIGN primitives in an order that differs from the order prescribed in the Serial Attached Small Computer System Interface specification.

6. The storage system of claim 5, wherein:
the sequence of ALIGN primitives are consecutive in a Serial Attached Small Computer System Interface DATA frame.

7. The storage system of claim 5, wherein:
the second device is operable to determine one or more capabilities of the additional set of capabilities of the first device based on the order of the ALIGN primitives from the first device.

8. The storage system of claim 1, wherein:
the first and second devices are operable to exchange patterns within DATA frames,
wherein each pattern comprises one or more bursts of consecutive data dwords and one or more bursts of consecutive ALIGN SAS primitive dwords, and
wherein each pattern indicates at least one of the set of capabilities in addition to a set of capabilities of the storage protocol.

9. A method operable in a storage system comprising first and second devices, wherein the first device comprises a set of capabilities in addition to a set of capabilities of the storage protocol, the method comprising:
communicatively coupling the first and second devices via a storage protocol; and
transferring a customized command from the first device to the second device through the communicative coupling to elicit a response from the second device if the second device has a set of capabilities in addition to the set of capabilities of the storage protocol that is similar to the additional set of capabilities of the first device,
wherein the customized command is operable to prevent a violation of the storage protocol if the second device does not have the similar additional set of capabilities.

10. The method of claim 9, wherein the storage protocol is a Serial Advanced Technology Attachment protocol.

11. The method of claim 9, wherein:
the storage protocol is a Small Computer System Interface protocol.

12. The method of claim 11, wherein:
the storage protocol is a Serial Attached Small Computer System Interface protocol.

13. The method of claim 12, further comprising:
configuring the customized command with a sequence of Serial Attached Small Computer System Interface ALIGN primitives in an order that differs from the order prescribed in the Serial Attached Small Computer System Interface specification.

14. The method of claim 13, further comprising:
via the first device, consecutively configuring the sequence of ALIGN primitives in a Serial Attached Small Computer System Interface DATA frame; and
via the second device, determining one or more capabilities of the additional set of capabilities of the first device based on the order of the ALIGN primitives from the first device.

15. The method of claim 9, further comprising:
exchanging patterns within DATA frames between the first and second devices,
wherein each pattern comprises one or more bursts of consecutive data dwords and one or more bursts of consecutive ALIGN SAS primitive dwords, and
wherein each pattern indicates at least one of the set of capabilities in addition to a set of capabilities of the storage protocol.

16. A non-transitory computer readable medium operable in a storage system comprising first and second devices, wherein the first device comprises a set of capabilities in addition to a set of capabilities of the storage protocol, the computer readable medium comprising instructions that, when executed by a processor in one or more of the first and second devices, direct the first and second devices to:
communicatively couple via a storage protocol; and
transfer a customized command from the first device to the second device through the communicative coupling to elicit a response from the second device if the second device has a set of capabilities in addition to the set of capabilities of the storage protocol that is similar to the additional set of capabilities of the first device,
wherein the customized command is operable to prevent a violation of the storage protocol if the second device does not have the similar additional set of capabilities.

17. The computer readable medium of claim 16, wherein the storage protocol is a Serial Advanced Technology Attachment protocol, a Small Computer System Interface protocol, a Serial Attached Small Computer System Interface protocol, or a combination thereof.

18. The computer readable of claim 17, further comprising instructions that direct the first device to:
configure the customized command with a sequence of Serial Attached Small Computer System Interface ALIGN primitives in an order that differs from the order prescribed in the Serial Attached Small Computer System Interface specification.

19. The computer readable medium of claim 18, further comprising instructions that:
direct the first device to consecutively configure the sequence of ALIGN primitives in a Serial Attached Small Computer System Interface DATA frame; and
direct the first device to determine one or more capabilities of the additional set of capabilities of the first device based on the order of the ALIGN primitives from the first device.

20. The computer readable medium of claim 16, further comprising instructions that direct the first and second devices to:
exchange patterns within DATA frames between the first and second devices,
wherein each pattern comprises one or more bursts of consecutive data dwords and one or more bursts of consecutive ALIGN SAS primitive dwords, and
wherein each pattern indicates at least one of the set of capabilities in addition to a set of capabilities of the storage protocol.

* * * * *